(12) United States Patent
Holmberg et al.

(10) Patent No.: US 6,491,127 B1
(45) Date of Patent: Dec. 10, 2002

(54) POWERED CASTER WHEEL MODULE FOR USE ON OMNIDIRECTIONAL DRIVE SYSTEMS

(75) Inventors: Robert Holmberg; James C. Slater, both of Mt. View, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/134,241

(22) Filed: Aug. 14, 1998

(51) Int. Cl.[7] .......................... B60K 1/00; B60K 17/14; B60K 17/30
(52) U.S. Cl. .................. 180/252; 180/234; 180/236; 180/21; 180/65.6; 180/253; 901/1; 301/6.5
(58) Field of Search .................................. 180/234, 236, 180/23, 24.08, 211, 212, 15, 16, 12, 13, 65.1, 65.5, 65.6, 252, 253, 24.06, 24.07, 21; 901/1; 301/5.3, 6.5

(56) References Cited

U.S. PATENT DOCUMENTS

| 4,519,466 A | * | 5/1985 | Shiraishi | 180/252 |
|---|---|---|---|---|
| 4,616,730 A | * | 10/1986 | Strehler et al. | 180/253 |
| 4,683,973 A | * | 8/1987 | Honjo et al. | 180/252 |
| 4,778,024 A | * | 10/1988 | Matsumoto et al. | 180/211 |
| 5,128,598 A | * | 7/1992 | Avitan | 180/252 |
| 5,567,019 A | * | 10/1996 | Raza et al. | 301/5.3 |
| 5,924,512 A | * | 7/1999 | Wada | 180/253 |
| 6,033,612 A | * | 3/2000 | Adams et al. | 301/5.3 |
| 6,036,278 A | * | 3/2000 | Boyer | 301/5.3 |

FOREIGN PATENT DOCUMENTS

| JP | 60-78831 | * | 4/1985 | 180/253 |
|---|---|---|---|---|
| JP | 61-285129 | * | 12/1986 | 180/252 |
| JP | 61-61827 | * | 3/1987 | |

* cited by examiner

*Primary Examiner*—Lanna Mai
*Assistant Examiner*—Ruth Ilan (57) ABSTRACT

A drive system base or platform, such as for a mobile robot, is disclosed having multiple caster wheels, each wheel having its own first motor for independent driving and its own second motor for independent steering. Each wheel is rotably and pivotably mounted in a separate wheel module, which includes both the driving and steering motors associated with the wheel. All of the wheel modules on the base are identical and interchangeable. The two motors of each module are mounted side by side in a vertical arrangement for compactness. Each wheel module includes a suspension for allowing each wheel to move vertically and independently relative to the base. The hub and tread of each wheel are each cast concentrically around a bevel drive gear in an offset manner to provide a wheel and bevel gear that turn more smoothly and precisely.

5 Claims, 7 Drawing Sheets

POWERED CASTER WHEEL MODULE FOR USE ON OMNIDIRECTIONAL DRIVE SYSTEMS

BACKGROUND OF THE INVENTION

1. Field of the Invention

The present invention relates generally to drive systems, and more particularly to powered caster wheel modules used to create drive systems such as for a mobile robot platform, automated guided vehicle (AGV), forklift, or omnidirectional powered roller conveyor.

2. Discussion of the Prior Art

Mobile robots have been developed in a myriad array of configurations. In general, a mobile robot will typically have a base or platform for supporting drive systems, controllers, sensors, manipulators, and whatever equipment is needed to allow the robot to perform its desired tasks. A mobile robot base can be driven by wheels, tracks, "legs" or a variety of other means.

It is useful for a mobile robot to be very maneuverable. The more agile the robot, the better it can deal with changing goals, obstacles, environments, and tasks. This is even more important when a manipulator is integrated with a mobile robot.

The mobility of a drive system increases with the ability to control an increasing number of independent degrees of freedom. For a vehicle that moves along the ground, there are three degrees of freedom available, most commonly described as two translations and one rotation. The ability to independently control all of the degrees of freedom available in the environment means that the system is omnidirectional. The ability to independently control the acceleration of all of the degrees of freedom available in the environment means that the system is holonomic.

To help achieve greater mobility, one or more caster mounted wheels can be utilized that pivot about a vertical axis as well as rotate about a horizontal axis. This arrangement makes the drive system omnidirectional. Preferably, the vertical steering axis does not intersect the horizontal drive axis. This offset arrangement allows the caster wheels to drive the robot and accelerate it in any direction, making it holonomic. In other words, the drive system can always create planer omnidirectional accelerations, velocities, and displacements of the robot, rather than requiring the robot wheels in some orientations to skid or to drive forward before turning to the side.

A mobile robot base has been previously developed which uses four caster wheels with intersecting horizontal and vertical axes for driving and steering the base. (Although the axes intersect, the "contact patch" of each wheel is offset from the vertical steering axis, making the system non-holonomic.) The driving axes of all of the wheels are linked together by a drive belt, and are driven by a single motor. Similarly, all of the steering axes of the wheels are linked together by a drive linkage, and are actuated by a second motor. However, this type of system, known as "synchro-drive," has several drawbacks. Because the wheels must all drive in the same direction and at same speed at any given moment, certain complex maneuvering cannot be performed. The motion-transmitting belts and linkages also add complexity and backlash to the drive train.

Prior art mobile robot caster wheels are typically driven by a bevel gear mounted on one side the wheel, outwardly facing and concentric with the axis of rotation. Both the bevel gear and the wheel often are standard "off the shelf" components. Mounting holes are provided through a flange on the bevel gear for receiving fasteners to secure the gear to the wheel. The bevel gear is aligned with the center of the wheel before being secured. However, inaccuracies in aligning the gear and accumulation of tolerances between the gear and the wheel bearings prevent the gear from being located in a truly concentric fashion, and from being precisely perpendicular to the rotation axis. Inaccuracies in the manufacture of the wheel and over, under, or uneven tightening of the fasteners can prevent the bevel gear from being precisely located laterally with respect to the mating pinion. Such misalignments of the bevel gear cause the gear to turn inconsistently and wear prematurely. Also, lack of concentricity precision between the wheel tread or outer wheel circumference and the axis of rotation causes the mobile robot base to run unevenly. These problems can prevent the robot from accurately maintaining its desired trajectory.

What is needed and is not provided by the prior art is an omnidirectional or holonomic drive system that exhibits a high degree of mobility and accuracy, yet is simple, compact and reliable.

SUMMARY OF THE INVENTION

Broadly stated, a drive system constructed according to the present invention can provide a robot, vehicle, or other device with a high degree of mobility and accuracy, yet is simple, compact and reliable.

In accordance with one aspect of the present invention, a drive system is provided with multiple caster wheels, each wheel having its own separate motor for driving the wheel and its own separate motor for steering. This allows each wheel to be driven and steered independently. The motion of multiple wheels can be coordinated for increased mobility. Complex linkages interconnecting the wheels are also eliminated.

In accordance with another aspect of the invention, each wheel is mounted in a separate wheel module, which includes both the driving and steering motors associated with the wheel. This modular arrangement of powered caster wheels allows a drive system for a mobile robot base or other device to be designed and built much easier than before. Since there are no mechanical, motion-transmitting linkages between modules, each can be built and tested independently. The easily removable modules can be extracted for maintenance. Using a common module in several places in a drive system reduces the cost of the system because of the increased number of each part. Common modules are easily replaced when damaged. Modules can be fastened to different sizes and configurations of robot bases to produce different vehicles without redesigning the drive system. The design is easily scaled to produce a powered caster wheel module of any size.

In accordance with still another aspect of the invention, the drive and steering motors are arranged in compact orientation such that their armatures are both vertically aligned and their outer housings are close together. This arrangement provides an efficient use of space and a compact footprint. Because the wheel module takes up less space on the mobile robot base or device, space is made available for more wheel modules or other components.

In accordance with yet another aspect of the invention, each wheel module is individually mounted on a resilient suspension to give a robot base a suspension. This ensures that all of the wheels maintain contact with the ground for precise motion and position tracking of the robot, and allows for smooth driving of the vehicle on uneven terrain.

In accordance with yet another aspect of the invention, a bevel gear is provided on one side of each wheel for driving the wheel, and bearings for rotatably mounting the wheel are located within a precision bore through the wheel. A rigid hub and resilient tire tread are cast in place around the bevel gear to form a wheel having a bevel gear and outer tire circumference that are highly concentric with the axis of rotation of the wheel. This arrangement provides for smooth rotation of each wheel and precise alignment between each bevel gear and its associated drive pinion.

DETAILED DESCRIPTION OF THE PREFERRED EMBODIMENT

Figure 1:
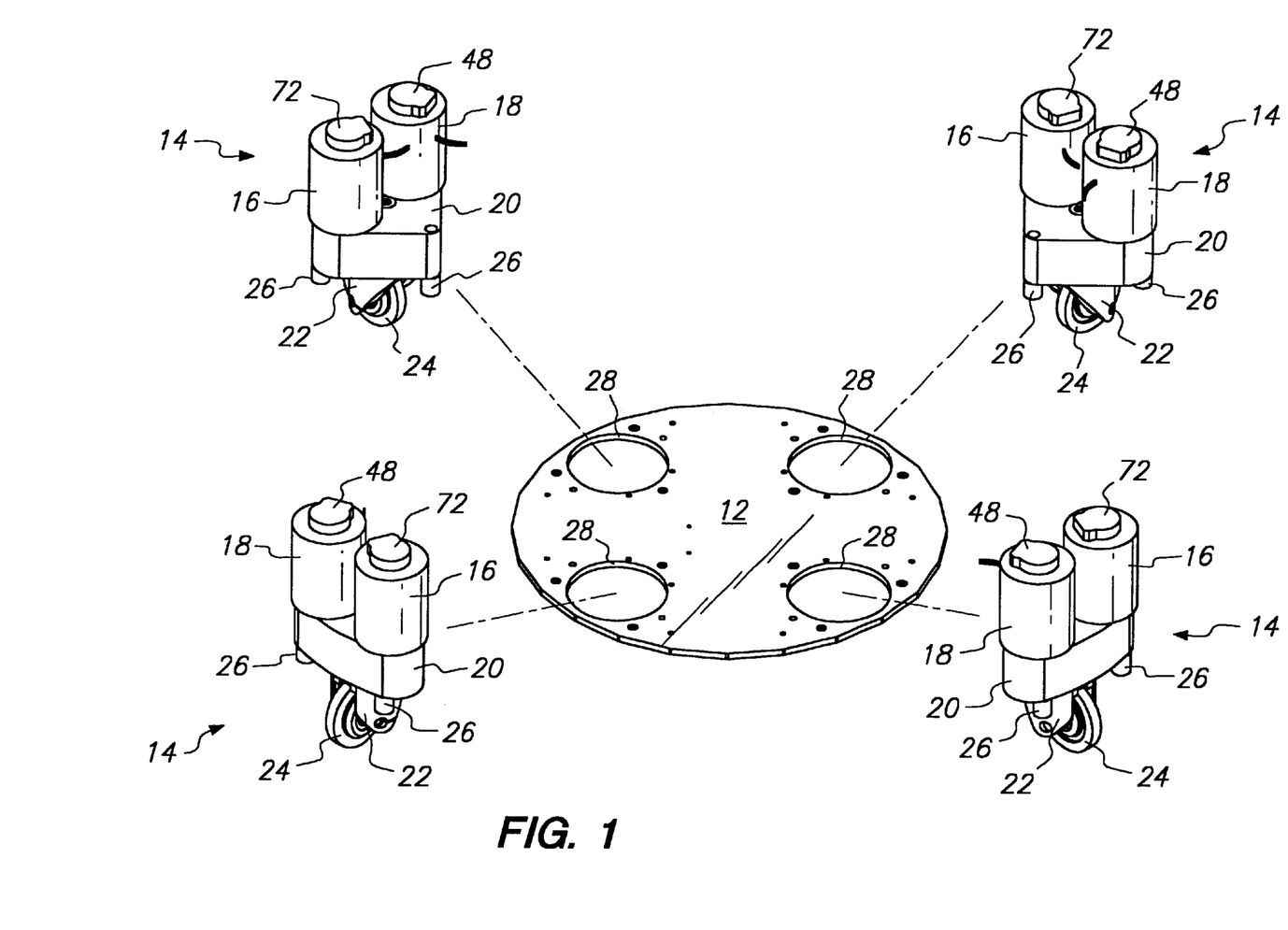
FIG. 1 is an exploded perspective view showing a mobile robot base and four powered caster wheel modules constructed according to the present invention.

Referring to FIG. 1, a mobile robot base 12 is shown configured for mounting four powered caster wheel modules 14. The four modules 14 are essentially identical, and serve to movably support robot base 12. Base 12 provides a platform for carrying the rest of a robot (not shown), such as a main enclosure, power source, controllers, sensors, manipulators, and other such components.

Each powered caster wheel module 14 includes a translation motor 16, a steering motor 18, a main housing 20, a lower forked housing 22, and a wheel 24. Each module 14 can be either rigidly mounted to base 12 with three standoffs 26, or movably attached with a suspension, as will be further described below. Standoffs 26 (if used), main housings 20, and motors 14 and 16 reside above base 12, while wheels 24 and the lower portions of lower housings 22 protrude through holes 28 in base 12.

Since each module 14 has its own motors, each wheel 24 may be independently driven either forward or reverse at any speed, and may be independently steered in any direction.

Figure 2A:
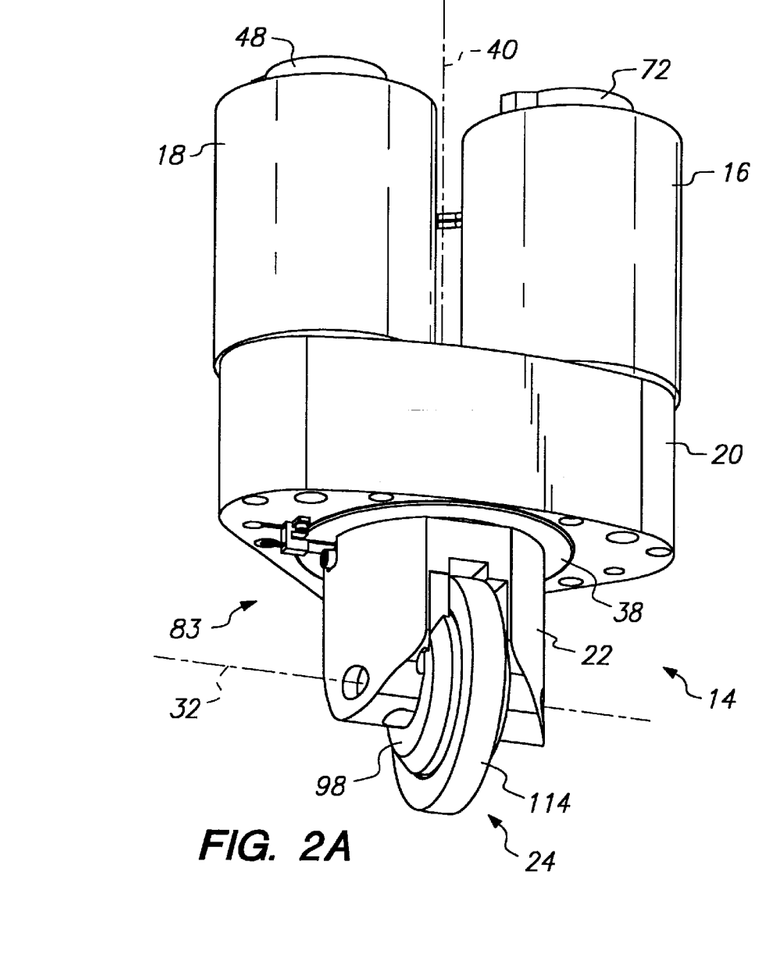
FIG. 2A is a perspective view showing the exterior components of a powered caster wheel module.
Figure 2B:
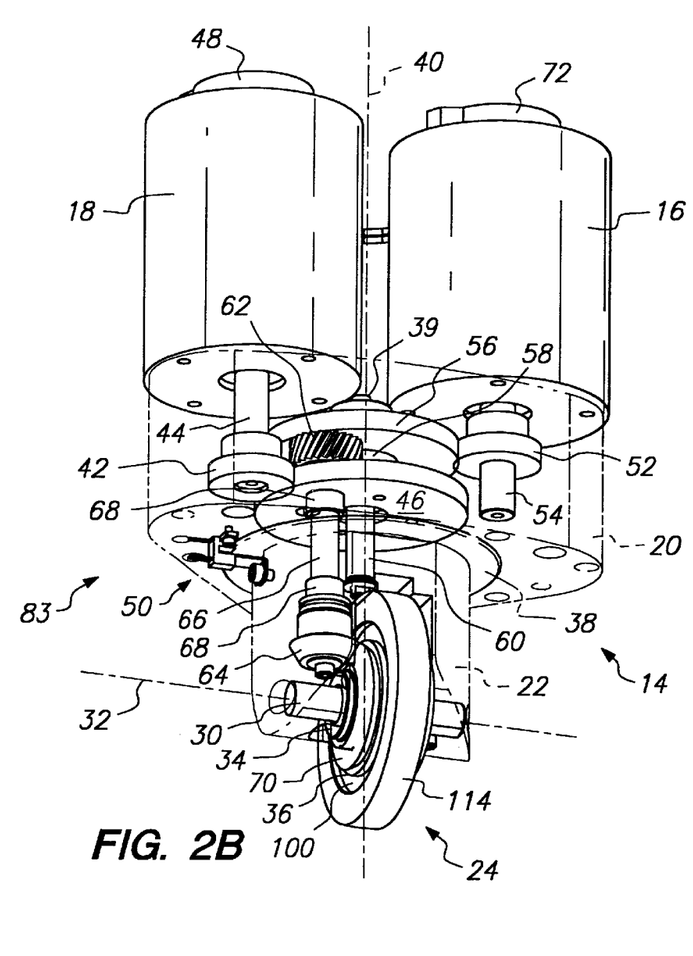
FIG. 2B is a perspective view showing the interior components of a powered caster wheel module.

Referring to FIGS. 2A and 2B, the components of a powered caster wheel module are shown. Wheel 24 is vertically mounted in lower housing 22 to rotate about wheel shaft 30 and horizontal axis 32. Two bearings 34 rotably support wheel hub 36 on shaft 30. Lower housing 22 is mounted to main housing 20 by ring bearing 38 (and by a secondary bearing 39, as will be described later), permitting lower housing 22 to rotate 360 degrees about vertical axis 40. Horizontal axis 32 and vertical axis 40 are mutually orthogonal. Preferably, axes 32 and 40 do not intersect and are offset 2.0 cm from each another. As shown in FIG. 2B, main housing 20 and lower housing 22 carry the components that drive and steer wheel 24, as will be described next.

Figure 3A:
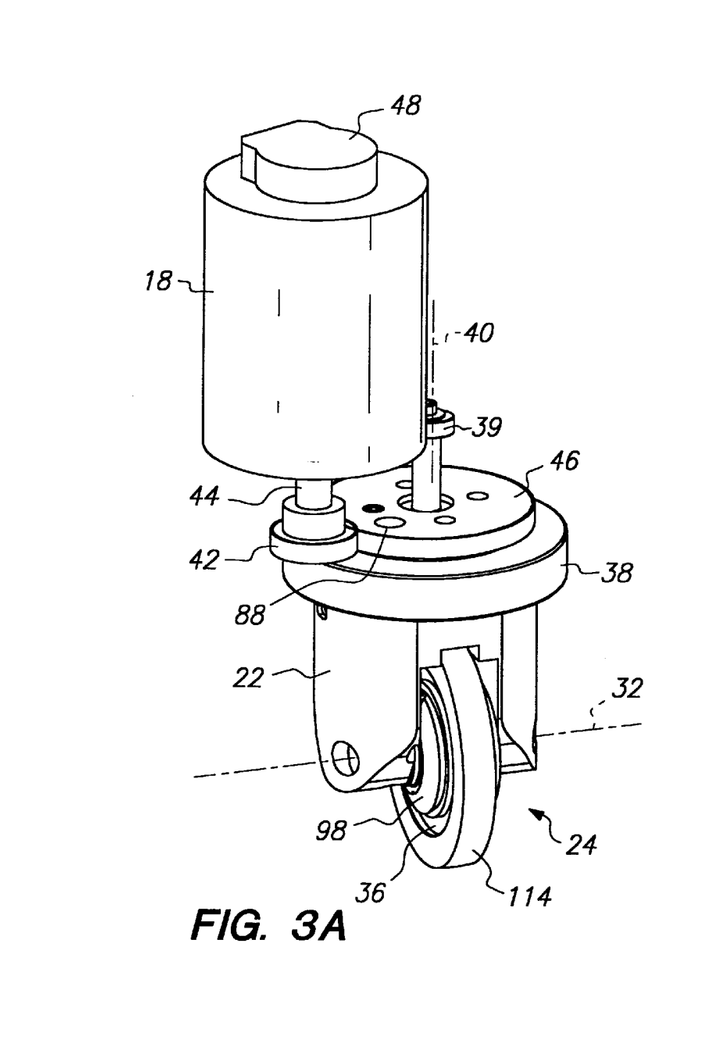
FIG. 3A is a perspective view showing the components of the caster steering gear train.
Figure 3B:
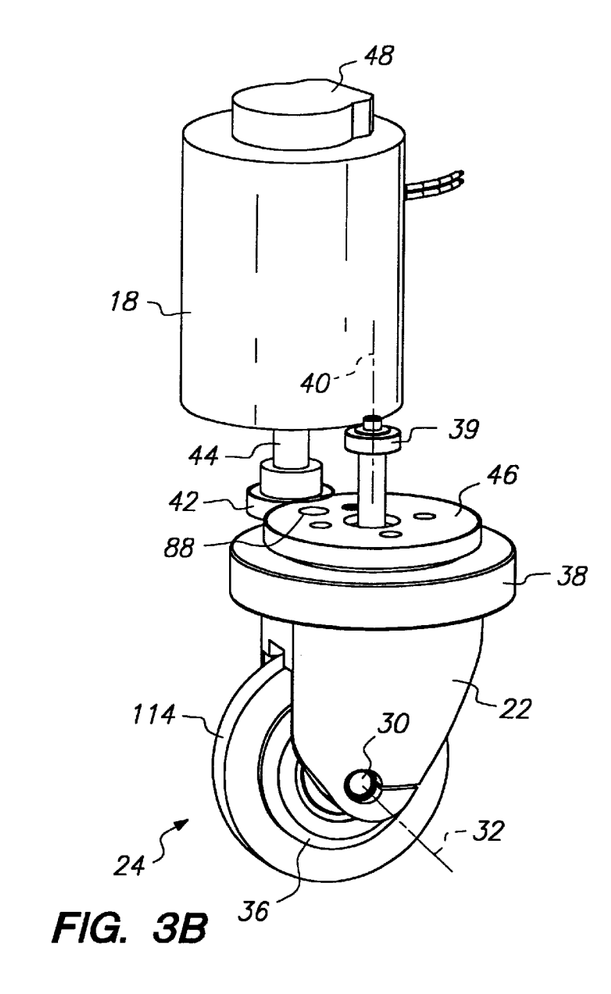
FIG. 3B is another perspective view similar to FIG. 3A showing the components from a different angle.

Referring to FIGS. 3A and 3B, the steering gear train will now be described. Steering pinion 42 is attached to the shaft 44 of steering motor 18, and engages steering gear 46, which is attached to the top of lower housing 22. Therefore, when steering motor 18 is energized (in either direction), lower housing 22 with wheel 24 rotates within ring bearing 38. Steering encoder 48 is mounted to the top end of steering motor 18 and is connected to motor shaft 44 to electronically indicate to the robot's motion controller (not shown) the incremental steering movement of wheel 24. A homing sensor 50 (shown in FIGS. 2A and 2B) has components connected to both main housing 20 and lower housing 22 to allow the motion controller to know the absolute steering position of wheel 24, as is well know in the art.

Turning the steering axis not only changes the direction of wheel 24, but also causes a displacement orthogonal to the direction of wheel 24. This is what makes holonomic motion possible.

Figure 4A:
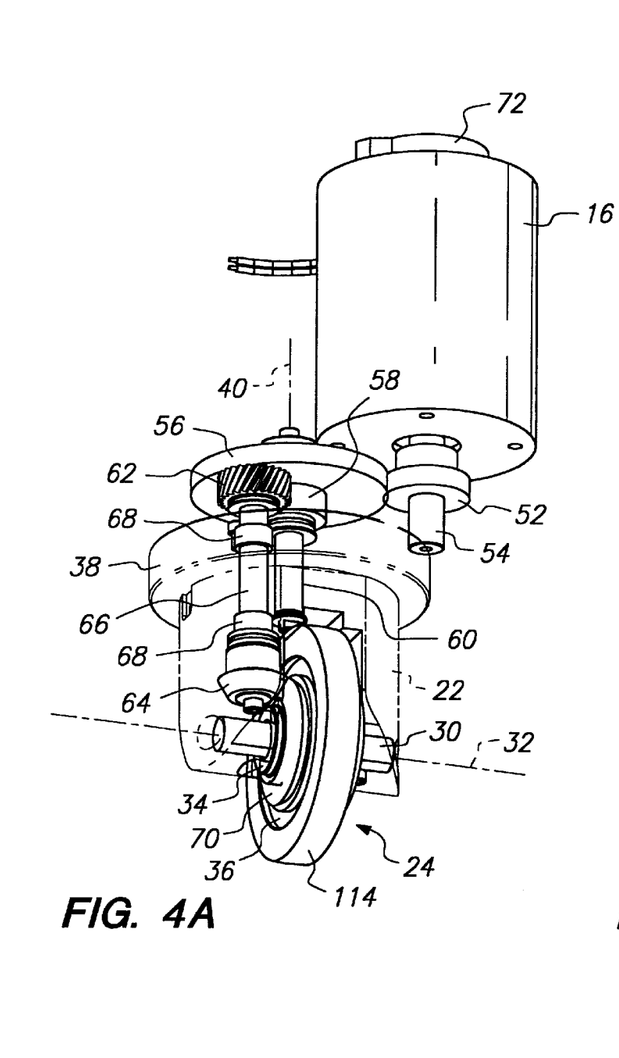
FIG. 4A is a perspective view showing the components of the caster translation gear train.
Figure 4B:
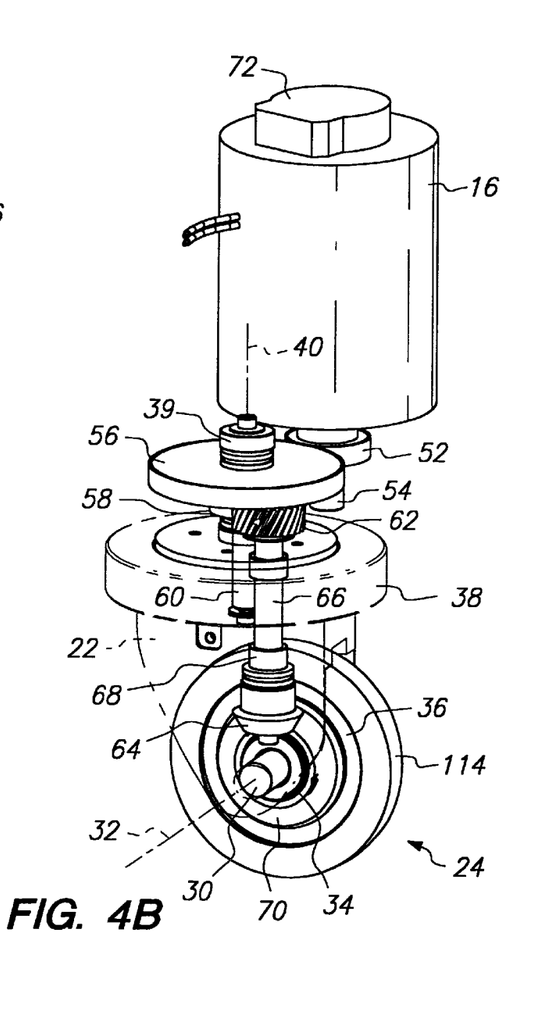
FIG. 4B is another perspective view similar to FIG. 4A showing the components from a different angle.

Referring to FIGS. 4A and 4B, the translation gear train will now be described. Translation pinion 52 is attached to the shaft 54 of translation motor 16, and engages translation gear 56. Translation reducing gear 58 is rigidly attached to gear 56, and rotates therewith around translation idler shaft 60. Idler shaft 60 is rigidly attached to lower housing 22. Reducing gear 58 drives translation offset gear 62. Offset gear 62 drives translation bevel gear pinion 64, as gears 62 and 64 are rigidly attached to opposite ends of translation driveshaft 66. Driveshaft 66 is rotably mounted within lower housing 22 by two bearings 68. Translation bevel gear pinion 64 drives translation bevel gear 70, which is attached to hub 36 of wheel 24. Therefore, when translation motor 16 is energized (in either direction), wheel 24 is driven through the translation gear train to rotate about its horizontal rotation axis 32 to drive a portion of the robot base 12 forward or reverse in the direction that wheel 24 is steered in. As with the steering gear train previously described above, the incremental motion of the translation gear train is sent to the motion controller by translation encoder 72 mounted atop translation motor 16.

Referring to FIG. 2B, it will be appreciated by those skilled in the relevant art that the steering and translation gear trains of this arrangement are not completely independent. Wheel 24 can be translated without affecting steering, but can not be steered without affecting translation. In particular, because translation drive shaft 66 is located on lower housing 22, it moves with lower housing 22 and pivots about vertical axis 40 when wheel 24 is steered. This motion causes attached translation offset gear 62 to rotate as it orbits or "walks around" the centrally located reducing gear 58. This in turn causes translation drive shaft 66 and translation bevel gear pinion to rotate and drive translation bevel gear and wheel 24. This unwanted coupling of the steering and translation motions can easily be negated by the electronic motion control system. In other words, whenever steering motor 18 is energized, translation motor 16 can also be energized (or increased or reduced in speed if already energized) at a predetermined speed to compensate for the translation effect caused by steering motor 18.

Figure 5A:
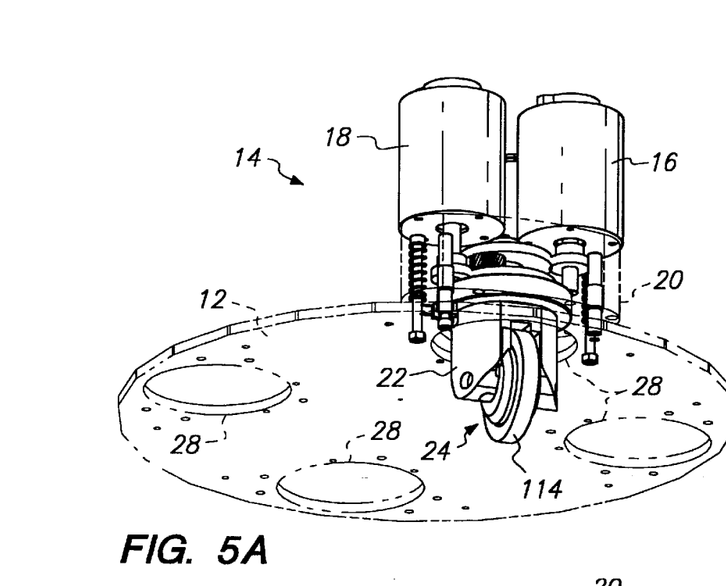
FIG. 5A is a perspective view showing a mobile robot base suspended from a powered caster wheel module (with the lower housing and base shown in phantom for clarity.)
Figure 5B:
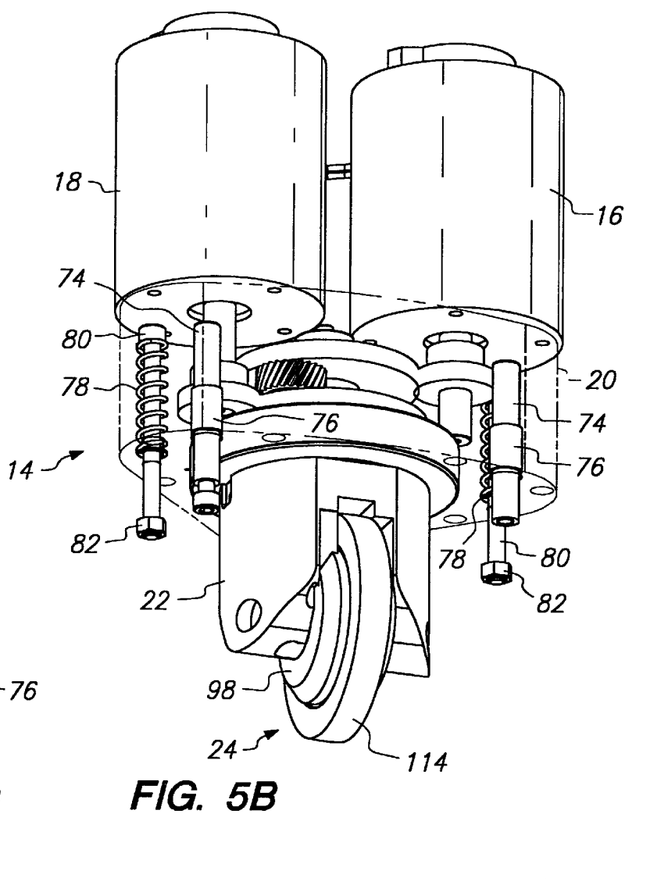
FIG. 5B is a perspective view showing the suspension components of a powered caster wheel module (with the lower housing shown in phantom for clarity.)
Figure 5C:
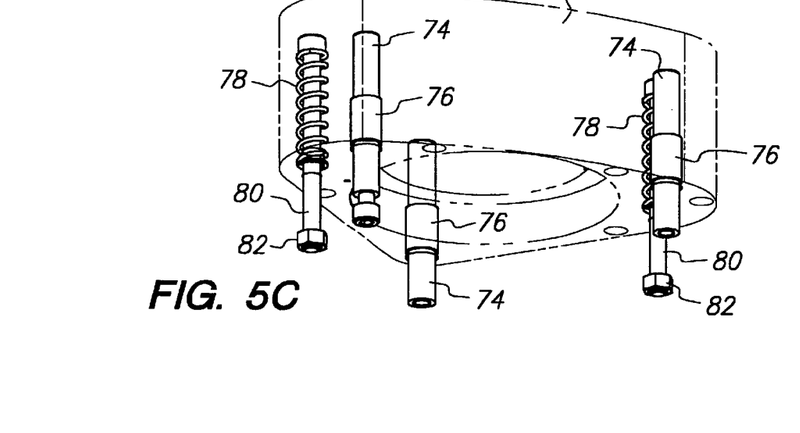
FIG. 5C is a perspective view similar to FIG. 5B showing just the suspension components.

Referring to FIGS. 5A–5C, the suspension feature of the present invention will be described. Main housing 20 includes three vertical bores adjacent to its three apexes for receiving three guide rods 74. Guide rods 74 are rigidly mounted to base 12 in a vertical fashion by fasteners. Bushings 76 are press fit into the bores to provide close fitting, sliding contact with guide rods 74. This arrangement allows powered caster wheel module 14 to have a vertical travel of over an inch relative to base 12. A resilient bumper (not shown), preferably made from urethane tubing, is located over the bottom of each guide rod 74 just above base 12 to cushion the movement of main housing 20 at the lower end of its travel.

Main housing 20 also includes two other vertical bores having reduced diameters at their lower ends, each for receiving and retaining a compression spring 78. Two bolts 80 each have a shank that passes through a spring 78, through the reduced diameter portion of one of the vertical bores, and through a hole in base 12. A nut 82 threaded onto the bottom of each bolt 80 is tightened against base 12, thereby captivating and compressing spring 78 between the reduced diameter of the bore and the head of bolt 80 residing in the bore. This arrangement allows base 12 to be suspended from powered caster wheel modules 14, with each module 14 having an independent suspension. When a wheel 24 of one or more modules 14 encounters a bump or uneven ground surface, module 14 can compensate by compressing springs 78 and rising upward on guide rods 74.

As previously indicated, powered caster wheel modules 14 can be mounted to base 12 in a fixed manner without a suspension. This is accomplished by mounting standoffs 26 to base 12 in place of guide rods 74 and bumpers, and removing springs 78 and bolts 80. Module 14 is held down on standoffs 26 by shorter bolts (not shown) which replace bolts 80 in housing 20. Everything else remains the same.

The above described module mounting system (either using the suspension system or standoffs 26) also allows each independent powered caster wheel module 14 to be quickly and easily removed and reinstalled on base 12, such as for maintenance, repair, or replacement. Since modules 14 are not interconnected, there are no belts or linkages to remove, replace, tension, adjust, etc. To remove module 14, electrical connections and two nuts 82 need only be removed. When module 14 is removed from base 12, bolts 80 and springs 78 are retained in their bores by motors 16 and 18.

In the preferred embodiment of powered caster wheel module 14, main housing 20 is 8.65 inches wide, 6.56 inches deep, and 3.00 inches tall. Its generally triangular shape allows room for other components, such as rectangularly-shaped framework and batteries, to be mounted to base 12 between modules 14.

Figure 6:
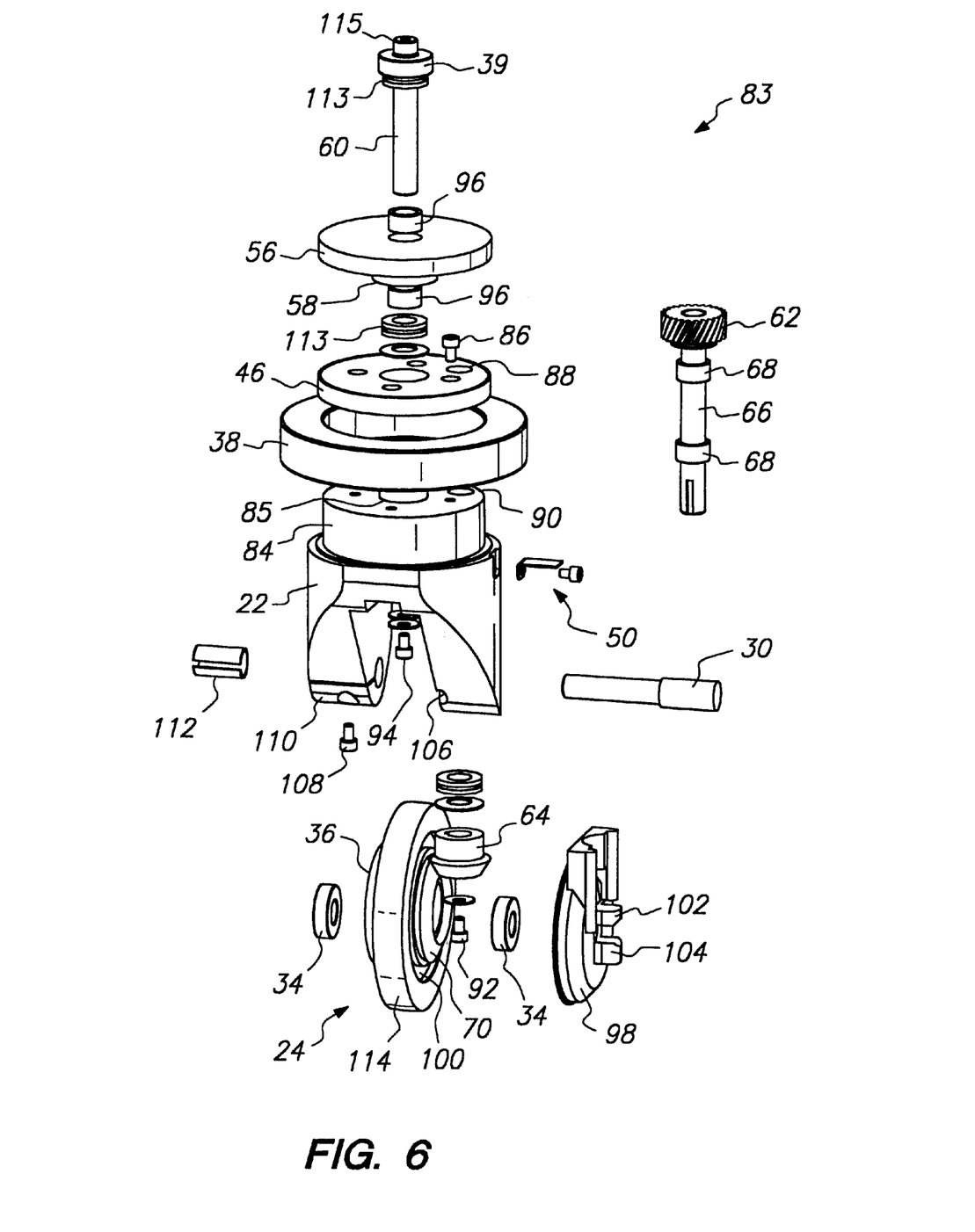
FIG. 6 is an exploded perspective view showing a powered caster wheel module.

Referring to FIG. 6, an exploded view of the lower housing assembly 83 is shown, providing more detail than the previous drawings. Ring bearing 38 is press fit onto turned portion 84 on lower housing 22. Boss 85 on top of lower housing 22 serves to center steering gear 46. Four fasteners 86 attach steering gear 46 to the top of lower housing 22.

Bores 88 and 90 are provided through steering gear 46 and lower housing 22, respectively, for receiving translation drive shaft 66. Fastener 92 and various washers and spacers (shown but not labeled) are used to attach bevel gear pinion 64 to drive shaft 66 and to hold drive shaft 66 rotably in place.

Fastener 94 engages the bottom of idler shaft 60 to fixedly secure idler shaft 60 within a stepped bore through the center of lower housing 22. Two bushings 96 and two bearings 113 are used to rotatably mount translation gear 56 and reducing gear 58 on idler shaft 60.

Rubber grease boot 98 is partially and slidably received within recess 100 in wheel hub 36, and fits between wheel 24 and one fork of lower housing 22 to cover beveled gear 70 and pinion 64. Fins 102 and 104 formed on grease boot 98 are received within groove 106 formed on the fork of lower housing 22 to prevent grease boot 98 from rotating with wheel 24. Fastener 108 is used to clamp down split collar 110 on the opposite fork onto split sleeve 112 to fix the preload of bearings 34 and fixedly retain wheel shaft 30.

The lower housing assembly 83 is retained in main housing 20 by ring bearing 38 which is press fit into main housing 20, and by secondary bearing 39. Secondary bearing 39 is attached to the top of idler shaft 60 by fastener 115, and bears against a stepped-diameter bore in main housing 20 through which idler shaft 60 passes. Ring bearing 38 carries the thrust from supporting the weight of the robot in normal operation. Secondary bearing 39 carries the thrust from supporting the weight of lower housing assembly 83 when the robot is raised such that wheel 24 leaves the ground.

Figure 7A:
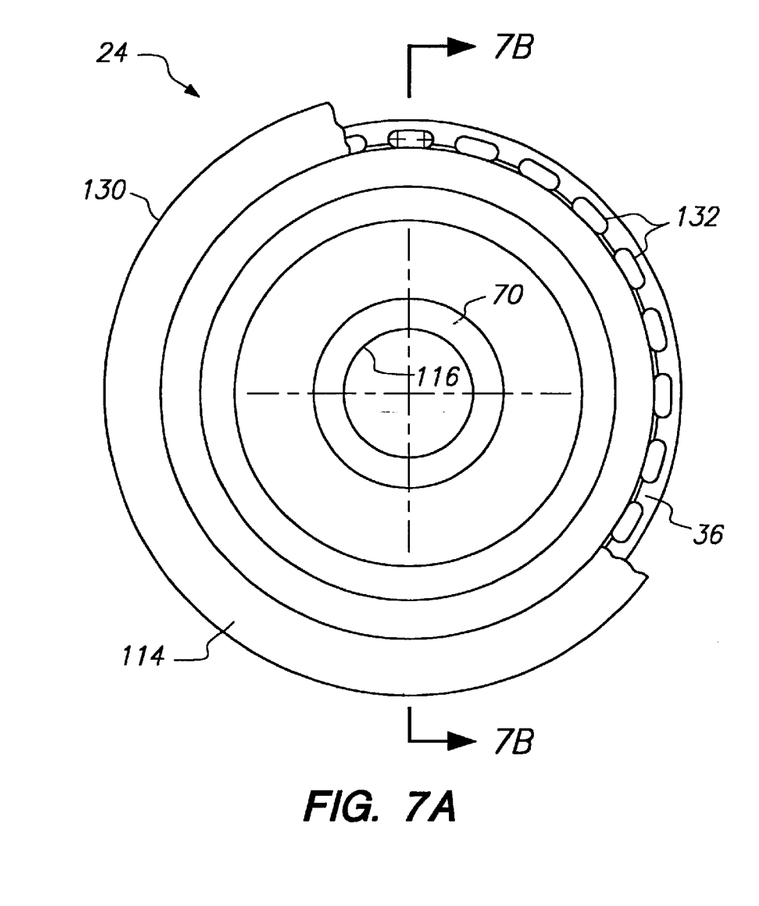
FIG. 7A is a broken-away side elevation view showing a wheel.
Figure 7B:
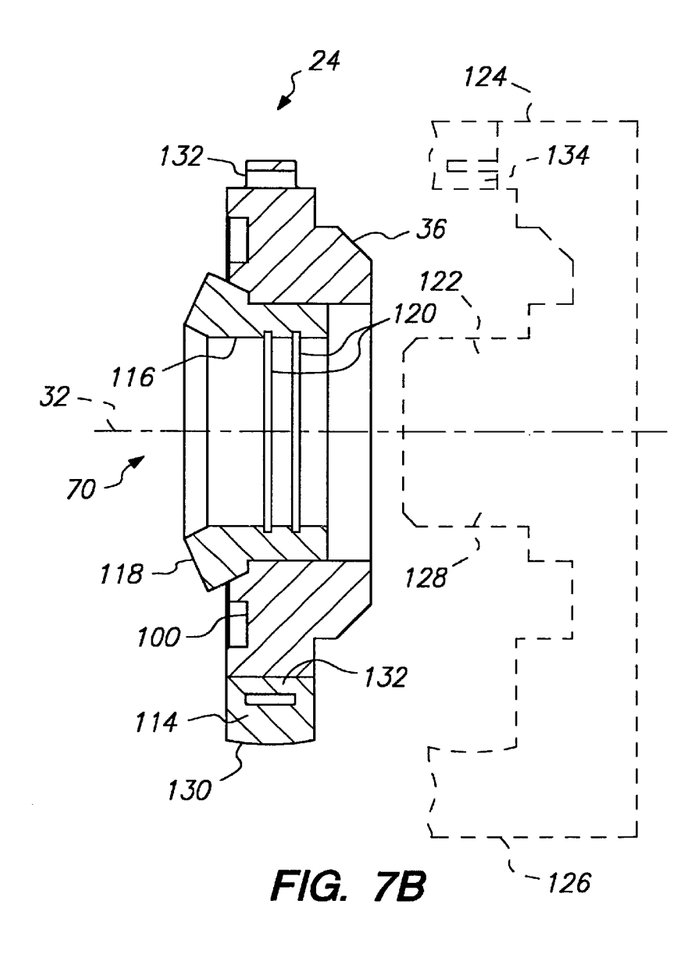
FIG. 7B is a cross-sectional view taken along line 7B—7B in FIG. 7A, and shows portions of a hub mold and a tread mold in phantom.

Referring to FIGS. 7A and 7B, the preferred construction of wheel 24 will be described. Wheel 24 comprises translation bevel gear 70, hub 36, and tread 114. Bevel gear 70 is preferably an "off the shelf" component with a precision bore 116, relative to which the gear's teeth 118 have been accurately machined. Bore 116 also serves to receive wheel bearings 34 (shown in FIG. 6.) Snap ring grooves 120 are provided within bore 116 for positioning bearings 34. Since bore 116 provides a reference both for machining teeth 118 and for locating wheel bearings 34, teeth 118 will be positioned in a highly concentric fashion around the axis of rotation 32 and in a plane precisely perpendicular thereto. With this arrangement, bevel gear 70 will mate much more precisely with pinion 64 than will a bevel gear ring of the prior art which is bolted to the wheel hub. Also, these assembly and alignment steps are eliminated in the manufacture of wheel 24.

Wheel hub 36 and tread 114 are cast in place around bevel gear 70 to provide a wheel 24 that also rotates more precisely around the axis of rotation 32. Bore 116 of bevel gear 70 is first placed over a precision mandrel 122 in a hub mold 124 to accurately center gear 70 in mold 124. Hub mold 124 is then filled with a hardenable resin around gear 70 and allowed to cure to form rigid hub 36 as shown. Preferably, a gravity mold process is used and the resin is a RS2920 toughened epoxy. Alternatively, a high durometer urethane or other liquid forming a rigid material can be used.

In a similar manner, bevel gear 70 and hardened hub 36 are placed in a tread mold 126, and are accurately centered in mold 126 by the precise fit between gear bore 116 and mandrel 128. Tread mold 126 is then filled with a hardenable tread material around hub 36, preferably an 80A durometer polyurethane, and allowed to cure to form resilient tread 114. Preferably, the outer circumference of tread mold 126 is rounded to form a crown 130 having a maximum diameter of 5.000 inches and a width of 0.630 inches.

To provide a more secure and dimensionally stable wheel tread 114, perforation slots 132 are formed axially through hub 36 adjacent to its outer circumference during the hub casting process by a series of prongs 134 protruding from one half of hub mold 124. Slots 132 are then filled by the tread material during the tread casting process. Because slots 132 are closed apertures (i.e. do not extend radially outward), the tread material formed within slots 132 helps prevent tread 114 from shifting or separating from hub 36. Alternatively, slots 132 can be any shape of closed aperture extending axially through hub 36.

The combination of mounting wheel bearings 34 directly within a precision bore 116 through bevel gear 70, casting hub 36 directly onto gear 70, casting tread 114 directly onto hub 36, and providing perforation slots 132 through hub 36 to help retain tread 114, results in a wheel assembly that runs more accurately and smoothly than powered caster wheels found on prior art mobile robots.

With little or no modification, the preferred embodiment of the inventive drive system described above can be used with devices other than mobile robots. For instance, the same or similar wheels and wheel modules can be used to create drive systems for automated guided vehicles (AGV's), forklifts, or omnidirectional powered roller conveyors. To create a material handling roller conveyor, the mobile robot base described above is inverted and remains stationary. Material having a generally horizontal bottom surface can then be located on the upwardly facing wheels to be rotated or translated in any horizontal direction by the wheels.

The above descriptions and drawings are for illustrative purposes only, and are not exhaustive of possible alternate embodiments of the invention. It is to be understood that the present invention is not limited to the sole embodiments described above and illustrated herein, but encompasses any and all variations falling within the scope of the appended claims.

What is claimed as the invention is:

1. A powered caster wheel module for use on a drive system, the module comprising:
   a wheel mounted for rotation about a horizontal axis and pivotably mounted for steering about a vertical axis;
   a first motor for driving the wheel about the horizontal axis;
   a second motor for driving the wheel about the vertical axis; and
   a housing for mounting the wheel and the two motors and attaching to a drive system base,
   wherein both the first and second motors have armature axes that are vertical and closely spaced to provide the module with a small footprint and compact design,
      vertical travel means located on the housing for allowing the housing to move vertically a predetermined distance with respect to a drive system base; and
      means for suspending the drive system base from a housing such that a base can move along the vertical travel means with respect to the housing when the wheel travels over an uneven surface.

2. A drive system base comprising:
   a drive system base member; and
   a plurality of powered caster wheel modules, each module being substantially identical and including:
      a wheel mounted for rotation about a horizontal axis and pivotably mounted for steering about a vertical axis;
      a first motor mounted on the module for driving the wheel about the horizontal axis;
      a second motor mounted on the module for driving the wheel about the vertical axis;
      a housing for mounting the wheel and the two motors and attaching to the drive system base member;
      vertical travel means located on the housing for allowing the housing to move vertically a predetermined distance with respect to the drive system base member; and
      means for suspending the drive system base member relative to the housing such that the base member can move along the vertical travel means with respect to the housing when the wheel travels over an uneven surface, each of the wheels being able to move vertically independent of the other wheels;
   wherein both the first and second motors have armature axes that are vertical and closely spaced to provide the module with a small footprint on the drive system base member and a compact design,
   wherein each module is separately removable from the base member as an integral unit, and each module is freely interchangeable with one of the other modules.

3. A drive system base comprising:
   a drive system base member; and
   a plurality of powered caster wheel modules, each module being substantially identical and including:
      a wheel mounted for rotation about a horizontal axis and pivotably mounted for steering about a vertical axis;
      a first motor mounted on the module for driving the wheel about the horizontal axis;
      a second motor mounted on the module for driving the wheel about the vertical axis; and
      a housing for mounting the wheel and the two motors and attaching to the drive system base member,
   wherein both the first and second motors have armature axes that are vertical and closely spaced to provide the module with a small footprint on the drive system base member and a compact design,
   wherein each module is separately removable from the base member as an integral unit, and each module is freely interchangeable with one of the other modules,
   wherein each of the wheels comprises:
      a beveled gear having a central bore for accommodating at least one bearing to support the gear for rotational motion, the gear having a plurality of gear teeth disposed circumferentially around an axial end of the gear;
      a rigid hub cast concentrically around the beveled gear and extending radially outward therefrom allowing the gear teeth to protrude from an axial side of the hub; and
      a resilient tread with an outer periphery cast concentrically around an outer circumference of the hub such that the outer periphery of the tread is precisely aligned concentrically with the central bore of the gear.

4. A drive system comprising:
   a base member; and
   a plurality of powered caster wheel modules, each module being substantially identical and including:
      a wheel mounted for rotation about a horizontal axis and pivotably mounted for steering about a vertical axis, the wheel being mounted in a caster fashion such that the horizontal rotation axis and the vertical steering axis do not intersect, the wheel including a beveled gear having a central bore for accommodating at least one bearing to support the gear for rotational motion, the gear having a plurality of gear teeth disposed circumferentially around an axial end of the gear, the wheel including a rigid hub cast concentrically around the beveled gear and extending radially outward therefrom allowing the gear teeth to protrude from an axial side of the hub, and a resilient tread with an outer periphery cast concentrically around an outer circumference of the hub such that the outer periphery of the tread is precisely aligned concentrically with the central bore of the gear;

a first motor mounted on the module for driving the wheel about the horizontal axis;

a second motor mounted on the module for driving the wheel about the vertical axis; and a housing for mounting the wheel and the two motors and attaching to the base member, vertical travel means located on the housing for allowing the housing to move vertically a predetermined distance with respect to the base member; and means for suspending the base member relative to the housing such that the base member can move along the vertical travel means with respect to the housing when the wheel travels over an uneven surface, each of the wheels being able to move vertically independent of the other wheels, wherein both the first and second motors of each module have armature axes that are vertical and closely spaced to provide the module with a small footprint on the base member and a compact design, and wherein each module is separately removable from the base member as an integral unit, and each module is freely interchangeable with one of the other modules.

5. A drive system according to claim 4, wherein the drive system base member is supported above the ground entirely by the wheels of the substantially identical wheel modules.

* * * * *